J. R. STOTELMYER & W. S. HENSELL.
TROLLEY WHEEL MOUNT.
APPLICATION FILED MAY 10, 1912.
1,102,453.
Patented July 7, 1914.
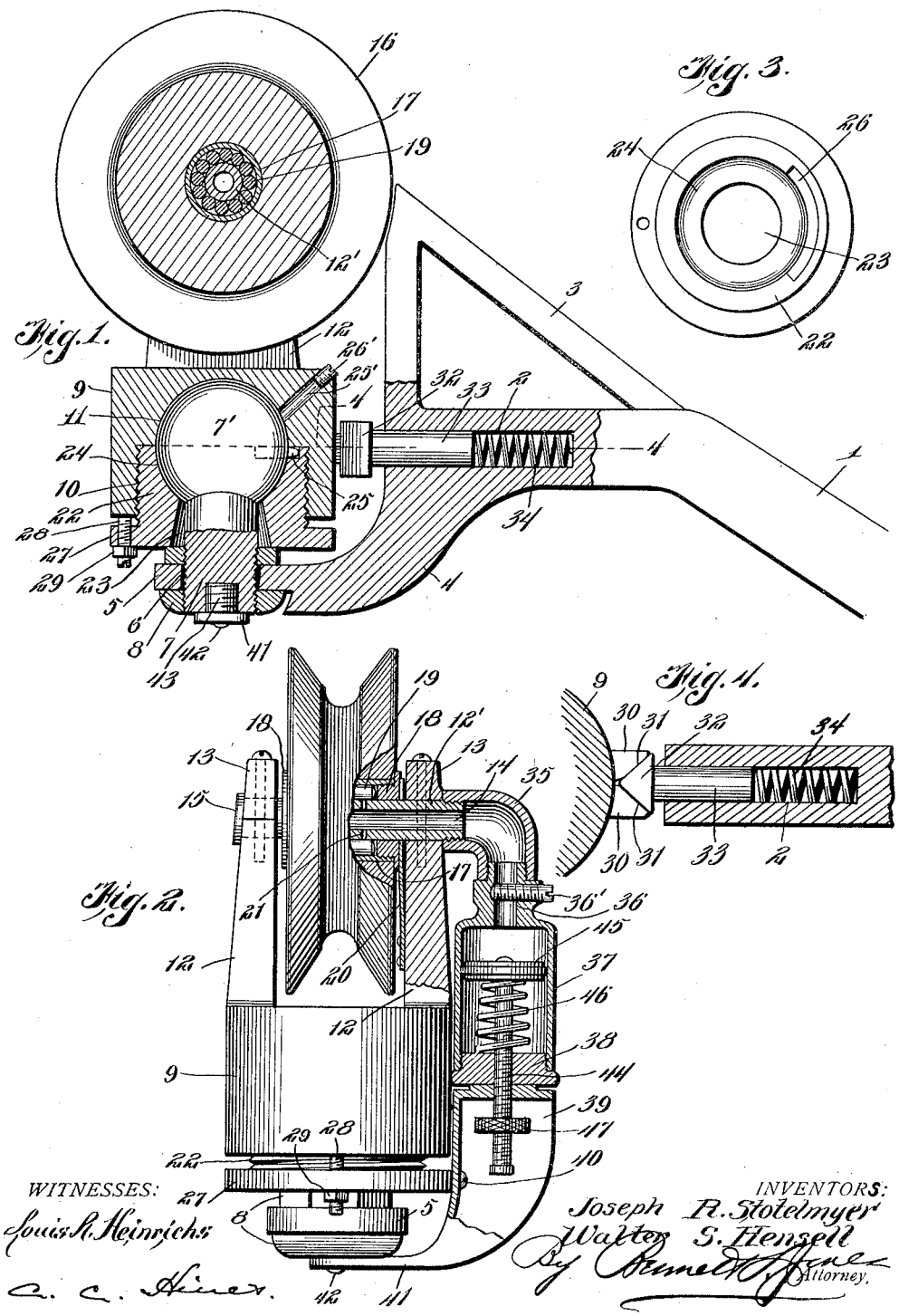
WITNESSES:
Louis R. Heinrichs
C. C. Hines
INVENTORS:
Joseph R. Stotelmyer
Walter S. Hensell
By Bennett, Attorney

UNITED STATES PATENT OFFICE.

JOSEPH R. STOTELMYER AND WALTER S. HENSELL, OF HAGERSTOWN, MARYLAND.

TROLLEY-WHEEL MOUNT.

1,102,453.  Specification of Letters Patent.  Patented July 7, 1914.

Application filed May 10, 1912. Serial No. 696,381.

*To all whom it may concern:*

Be it known that we, JOSEPH ROBERT STOTELMYER and WALTER S. HENSELL, citizens of the United States, residing at Hagerstown, in the county of Washington and State of Maryland, have invented certain new and useful Improvements in Trolley-Wheel Mounts, of which the following is a specification.

This invention relates to trolleys for electric railway cars, the main object of the invention being to provide a trolley in which the trolley wheel is swiveled to turn on an axis, to adapt it to accommodate itself to curves and irregularities in the conductor wire, and thereby prevent it from accidentally leaving the wire.

A further object of the invention is to provide means for firmly retaining the wheel spindle in position, bracing the stationary member of the swivel connection and lubricating the journal bearings, and also for limiting the axial movements of the wheel and returning the same to normal position.

A still further object of the invention is to provide a construction of trolley which may be economically manufactured, and which permits of the ready assemblage, repairs and replacement of parts.

The invention consists of the features of construction, combination and arrangement of parts hereinafter fully described and claimed, reference being had to the accompanying drawings, in which:—

Figure 1 is a longitudinal section of a trolley wheel and pole embodying our invention. Fig. 2 is an end elevation of the same, with parts in vertical transverse section. Fig. 3 is a bottom plan view of the wheel supporting member. Fig. 4 is a detail section on line 4—4 of Fig. 1.

Referring to the drawing, 1 designates a trolley pole or a bracket adapted for attachment thereto, said pole or bracket having a longitudinal socket 2 opening through its outer end, an upstanding shield 3 and an arm 4 provided with a reduced extension 5 formed with an opening 6. The opening 6 receives a threaded wheel-supporting stem or shank 7 fastened in position by clamping nuts 8. Said stem or shank carries at its upper head a spherical ball or head 7'. The trolley comprises a wheel-supporting member 9 formed in its base with an internally threaded socket 10 and above said socket with a semi-circular cavity 11, and having upstanding fork arms 12 formed with recesses to receive the trolley wheel spindle 12' which is clamped in position by removable cap pieces 13. This spindle is hollow and has a threaded open end 14, while its opposite end is closed by a flanged head 15.

The bore of the wheel 16 receives a bushing 17 closed at its ends by flanged screw caps 18 which clamp it to the wheel. Inclosed within said bushing between the caps are anti-friction roller bearings 19 which turn in contact with the bushing and spindle and provide for an easy revoluble motion of the wheel. These bearing elements may be removed when the wheel is worn and discarded and applied to a new wheel, and the construction described also permits new roller bearings to be substituted for old ones when occasion requires. A leaf spring 20 is fixed at one end to one of the fork arms and has its free end forked to straddle the spindle and bear against the adjacent screw cap and limit the lateral play of the wheel on the spindle. On the removal of the cap pieces 13 the wheel and spindle may be removed for repairs or renewal of parts, as occasion requires. The hollow spindle forms a lubricant feed channel and is provided with perforations 21 for the passage of the lubricant to the bearing surfaces.

The wheel supporting member 9 carries a threaded retaining member 22 which enters and engages the threaded socket 10. Said member 22 is formed with a vertical passage 23 through which the stem or shank 7 extends, which passage communicates at its upper end with a semi-spherical cavity 24 coöperating with the cavity 11 in the member 9 to form a circular or spherical socket to receive the ball or head 7', whereby the trolley is supported for rotary motion on the head to adapt it to swing laterally to enable the wheel 16 to follow curves or irregularities in the conductor wire without coming off the wire. For the purpose of also permitting the trolley to tilt laterally to a determined degree while following a curve in the track, the passage 23 is made flaring as shown, and to limit the rotary and tilting motion of the trolley the head 7' is provided with a conical or tapered lug or projection 25 which is relatively movable both vertically and circumferentially within a partially circular recess 26 formed in the member 22 whereby the trolley is permitted to tilt laterally and turn or rotate on its axis to a desired extent to efficiently perform its described functions. As shown, the member 9 is provided with a duct 25' through which the bearing surfaces of the ball and socket joint may be lubricated, said duct being normally closed by a screw plug 26'. The member 22 is also shown as provided with a flange 27 having a threaded hole for passage of a binding screw 28, which bears against the member 9 and holds said members 9 and 22 against relative rotation. Engaging said screw is a check nut 29 which prevents it from loosening. Formed on the rear face of the member 9 is a pair of spaced lugs 30 having inner beveled faces 31, between which lugs is normally arranged a head 32 having coacting beveled faces, said head being carried by a stem 33 slidable in the socket 2 and backed by an expansion spring 34 disposed in said socket. When the wheel supporting member and retaining member turn or rotate laterally in either direction with the wheel, the beveled face of one or the other of the lugs 30 slides over the adjacent beveled face of the head 32, forcing the stem backwardly into the socket against the resistance of the spring 34, the acting lug and head thus permitting the said members to turn to a determined degree and forming a yielding resistance and stop members to limit the turning movement. When the turning pressure upon the wheel ceases and the wheel begins to return to normal position, this operation is facilitated by the expansion of the spring 34 and action of the beveled head on the mentioned lug, whereby a positive return movement of the trolley wheel and its support is insured. When the trolley wheel and support turn in the opposite direction, the other or opposite lug coacts with the head to perform the same functions. The shield 3 is arranged so as to come in close proximity to the portion of the trolley wheel lying above the space between the rotary support and bracket arm, to prevent any possibility of the feed wire or a crossing wire passing downwardly into said space and becoming caught in the trolley.

The threaded end of the hollow spindle receives an elbow coupling 35 which communicates with the upper threaded end 36 of a lubricant cylinder or receptacle 37, which receptacle is closed at its lower end by a screw cap 38. A valve 36' is provided in the part 36 to control the feed of the lubricant. The receptacle is arranged vertically at one side of the trolley support and rests upon a bracket member 39, suitably secured to the flange of the retaining member 22, as by screws 40, and having at its lower end an arm 41 pivotally connected in any suitable manner to the lower end of the stem or shank 7, as by means of a screw 42 entering a threaded plug 43 fitted in said shank.

A stem 44 is slidably mounted in the plug 38 and top of the bracket 39 and carries at its upper end within the cylinder 37 a piston 45. This piston is provided for forcing the lubricant contained within the cylinder through the upper end 36 of said cylinder, and through the coupling 35 into the hollow spindle, from which it passes to the anti-friction bearings to lubricate the trolley wheel, the piston being normally urged on its feeding motion by a spring 46. The stem is threaded to receive an adjusting and stop nut 47, adapted to abut against the top of the bracket to limit the upward motion of the piston, whereby provision may be made for the use of different kinds of lubricant. It will be seen that the lubricator is mounted to turn freely with the trolley wheel, and thus is always maintained in condition for automatic action, and that it acts as a stay to prevent the wheel from having undue oscillation.

From the foregoing description taken in connection with the accompanying drawing, the construction and mode of operation of our improved trolley will be readily understood, and it will be seen that the invention provides a trolley which is adjustable to accommodate itself to curves and irregularities in the line wire without undue wear or liability of jumping the wire, whereby the necessity of constantly replacing the trolley wheel on the wire is avoided, also that the construction described enables the parts to be easily and conveniently assembled and disassembled for repairs and replacement of parts whenever occasion requires. It will further be seen that the invention provides simple and effective means for normally maintaining the trolley wheel in working position, together with a lubricating mechanism mounted to turn or rotate with the wheel, whereby an automatic lubricating action is at all times insured.

We claim:—

1. In a support for trolley wheels, a pole having a horizontal portion provided with a recess therein and terminating in an arm having a horizontal portion, a shank carried by and projecting upwardly from said horizontal portion of the arm, a ball carried by the shank, a socket mounted to rotate horizontally and tilt vertically upon the ball, said socket being provided with fork arms, a trolley wheel journaled in said fork arms, spaced beveled surfaces on the socket, and a spring actuated plunger movable in said recess and having a head provided with beveled surfaces extending between and coacting with the beveled surfaces on the socket to limit the rotary movement thereof.

2. In a support for trolley wheels, a pole having a horizontal portion provided with a depending arm extending parallel therewith, a shank extending upwardly from said arm and carrying a ball, a socket mounted upon the ball to rotate horizontally and tilt vertically, said socket being provided with fork arms, interengaging elements upon the socket and horizontal portion of the pole for limiting the rotary motion of the socket in either direction, and a trolley wheel journaled upon said fork arms.

3. In a support for trolley poles, a pole having a horizontal portion provided with an arm disposed below the plane thereof and parallel therewith, a ball member rising vertically from said arm, a socket mounted to revolve horizontally and to tilt longitudinally and laterally on said ball member, a trolley wheel journaled on the socket member, spaced stops on said socket member having opposed beveled faces, and a spring projected plunger mounted upon the horizontal portion of the pole and provided with a beveled head coöperating with the beveled surfaces of the stop members to limit the opposite horizontal rotary movement of the socket member to a predetermined degree.

4. In a support for trolley poles, a pole having a horizontal portion provided with an arm disposed below the plane thereof and parallel therewith, a ball member rising vertically from said arm, a socket mounted to revolve horizontally and to tilt longitudinally and laterally on said ball member, a trolley wheel journaled on the socket member, spaced stops on said socket member having opposed beveled faces, a spring projected plunger mounted upon the horizontal portion of the pole and provided with a beveled head coöperating with the beveled surfaces of the stop members to limit the opposite horizontal rotary movement of the socket member to a predetermined degree, and stop elements upon the ball and socket members operative to permit the socket member to have a wider range of horizontal rotary motion and to limit such motion in the event of the passage of either of said stop members out of engagement with and beyond the head of the plunger.

In testimony whereof we affix our signatures in presence of two witnesses.

JOSEPH R. STOTELMYER.
WALTER S. HENSELL.

Witnesses:
LEWIS E. TURNER,
J. HUBERT STOTELMYER.

---

Copies of this patent may be obtained for five cents each, by addressing the "Commissioner of Patents, Washington, D. C."